United States Patent
Kondou et al.

(10) Patent No.: US 9,828,250 B2
(45) Date of Patent: Nov. 28, 2017

(54) METHOD OF PREVENTING POLYSILICON FROM BEING CONTAMINATED WITH METALS

(75) Inventors: Manabu Kondou, Shunan (JP); Reiji Yoshimura, Shunan (JP)

(73) Assignee: TOKUYAMA CORPORATION, Shunan-Shi (JP)

( * ) Notice: Subject to any disclaimer, the term of this patent is extended or adjusted under 35 U.S.C. 154(b) by 1548 days.

(21) Appl. No.: 13/394,009

(22) PCT Filed: Sep. 17, 2010

(86) PCT No.: PCT/JP2010/066187
§ 371 (c)(1),
(2), (4) Date: Mar. 2, 2012

(87) PCT Pub. No.: WO2011/040269
PCT Pub. Date: Apr. 7, 2011

(65) Prior Publication Data
US 2012/0156413 A1    Jun. 21, 2012

(30) Foreign Application Priority Data
Sep. 30, 2009  (JP) .................................. 2009-226630

(51) Int. Cl.
*B23P 11/00* (2006.01)
*B23P 17/04* (2006.01)
(Continued)

(52) U.S. Cl.
CPC ............... *C01B 33/02* (2013.01); *B01J 19/02* (2013.01); *B01J 2219/0245* (2013.01);
(Continued)

(58) Field of Classification Search
CPC .......... B65D 25/14; B65D 25/16; B65D 1/00; B65D 1/005; B01J 19/02; Y10T 428/1359;
(Continued)

(56) References Cited

U.S. PATENT DOCUMENTS 4,792,493 A    12/1988  Bertram et al.
5,300,335 A *  4/1994   Miyazawa ............... B32B 15/08
                                                      220/62.11
(Continued)

FOREIGN PATENT DOCUMENTS

CN    2589063 Y    12/2003
JP    64074309 A * 3/1989
(Continued)

OTHER PUBLICATIONS

Martienssen, W., et al., Springer Handbook of Condensed Matter and Materials Data, Heidelberg: Spring, 2005.*
(Continued)

*Primary Examiner* — Lee E Sanderson
(74) *Attorney, Agent, or Firm* — Birch, Stewart, Kolasch & Birch, LLP

(57) ABSTRACT

[Problems] To provide a method of preventing the polysilicon from being contaminated with metals by providing a resin cover on the surface of a metal substrate that comes in contact with the polysilicon, wherein the metal surfaces are reliably prevented from being exposed that is caused by the wear of the cover.
[Means for Solution] A method of preventing the polysilicon from being contaminated with metals caused by the contact of the polysilicon with a metal substrate by providing a resin cover on the surface of the metal substrate, wherein the resin cover 3 comprises two kinds of resin sheets 3a and 3b overlapped one upon the other.

1 Claim, 1 Drawing Sheet

(51) Int. Cl.
*B32B 1/00* (2006.01)
*B32B 15/08* (2006.01)
*C01B 33/02* (2006.01)
*B01J 19/02* (2006.01)

(52) U.S. Cl.
CPC .... *Y10T 29/49826* (2015.01); *Y10T 29/49964* (2015.01); *Y10T 428/1359* (2015.01); *Y10T 428/24008* (2015.01); *Y10T 428/31678* (2015.04)

(58) Field of Classification Search
CPC ....... F16B 35/00; C01B 33/02; C01B 33/023; C01B 33/025; C01B 33/027; C01B 33/029; C01B 33/03; C01B 33/031; C01B 33/033; C01B 33/035; C01B 33/037; C01B 33/039; B65G 11/00; B65G 11/16; B65G 11/163; B65G 11/166
USPC ........ 428/35.9, 457–468, 36.9, 36.91, 36.92; 206/524.2; 411/903, 908
See application file for complete search history.

(56) References Cited

U.S. PATENT DOCUMENTS

| | | | |
|---|---|---|---|
| 5,626,907 A * | 5/1997 | Hagiwara | B05D 5/083 427/202 |
| 5,885,029 A | 3/1999 | Kotani et al. | |
| 7,490,785 B2 | 2/2009 | Weidhaus | |
| 2002/0081435 A1 | 6/2002 | Katsamberis et al. | |
| 2004/0000746 A1 * | 1/2004 | Montagna | B29C 51/02 264/544 |
| 2005/0101070 A1 | 5/2005 | Tsujiuchi et al. | |
| 2006/0070569 A1 | 4/2006 | Andrejewski et al. | |

FOREIGN PATENT DOCUMENTS

| | | | | |
|---|---|---|---|---|
| JP | 3-48481 U | | 5/1991 | |
| JP | 03279288 A | * | 12/1991 | |
| JP | 6-100312 A | | 4/1994 | |
| JP | 11-169795 A | | 6/1999 | |
| JP | 2007-51061 A | | 3/2007 | |
| NZ | WO 2007069921 A1 | * | 6/2007 | ............ B65G 11/08 |
| TW | 2005-27587 A | | 8/2005 | |

OTHER PUBLICATIONS

Encyclopedia of Polymer Science and Engineering, New York: Wiley, 1986.*
The hardness comparison chart from Redwood Plastics available online on Oct. 13, 2011 at https://web.archive.org/web/20141021123537/http://www.redwoodplastics.com /brochures/plastic-hardness-comparison-chart.pdf.*
Taiwanese Office Action dated Jul. 3, 2014, issued in corresponding Taiwanese Patent Application 099131800.
PCT/ISA/210—International Search Report dated Nov. 2, 2010, issued in PCT/JP2010/066187.
Extended European Search Report, dated Jul. 29, 2015, for corresponding European Application No. 10820388.6.

* cited by examiner

METHOD OF PREVENTING POLYSILICON FROM BEING CONTAMINATED WITH METALS

TECHNICAL FIELD

This invention relates to a method of preventing polysilicon from being contaminated with metals. More specifically, the invention relates to a method of preventing polysilicon from being contaminated with metals that is caused by the contact between the polysilicon and a metal substrate.

BACKGROUND ART

Polysilicon has been used as a starting material of semiconductors or wafers for solar generation, and must be in a highly pure form. From the standpoint of avoiding a decrease in the electric properties such as resistance, in particular, the polysilicon must be prevented from being mixed with metal impurities as much as possible.

The polysilicon is, usually, produced by reducing a silicon compound such as trichlorosilane with hydrogen or the like, and is obtained in the form of rods or a large masses. The polysilicon obtained in such a form is crushed, and from which contaminants adhered thereto during the crushing are removed by etching. The polysilicon is then passed through the steps of washing with water and drying, and is conveyed to the step of producing single crystals of silicon. In these steps, there are used various metal members (such as chute, hopper, crusher bed, etching vessel, water-washing vessel, drier, etc.), and the polysilicon must be prevented from being contaminated with metals as a result of coming in contact with these metal members.

To avoid the polysilicon from being contaminated with metals, the simplest means is to use resin members instead of metal members. For example, a patent document 1, paragraph [0003], teaches the use of resin members at portions where metals come in contact with the polysilicon in addition to teaching the problem of contamination of the polysilicon with metals.

PRIOR ART DOCUMENT

Patent Document

Patent document 1: JP-A-11-169795

OUTLINE OF THE INVENTION

Problems that the Invention is to Solve

As compared to the metal members, however, the resin members have a problem in regard to the strength and durability. In most cases, therefore, it is not allowed to replace the metal members by the resin members. For the metal member such as the hopper described above, for example, the countermeasure has been taken by providing a resin cover on the surfaces thereof.

The problem, however, still remains even by providing the resin cover. That is, the resin products are subject to be more abraded by wearing than the metal products. Despite the resin cover is provided, therefore, the metal surfaces are exposed due to the wear of the resin cover arousing a problem in that the polysilicon is contaminated with metals. In order to reliably avoid the above problem, further, the quality control must be frequently conducted and, besides, the entire members must be closely checked to find out the portions where the resin cover is worn out and the metal surfaces are exposed. When the metal member is large in size and the resin cover is provided to cover the large areas, in particular, a very large burden is exerted on the work of quality control.

It is, therefore, an object of the present invention to provide a method of preventing the polysilicon from being contaminated with metals by providing a resin cover on the surface of a metal substrate that comes in contact with the polysilicon, wherein the metal surfaces are reliably prevented from being exposed that is caused by the wear of the cover.

Another object of the present invention is to provide a method of preventing the polysilicon from being contaminated with metals, enabling the wear of the resin cover to be quickly discovered and reducing the burden on the work of quality control.

Means for Solving the Problems

According to the present invention, there is provided a method of preventing polysilicon from being contaminated with metals caused by contact of the polysilicon with a metal substrate by providing a resin cover on a surface of the metal substrate, wherein the resin cover comprises two kinds of resin sheets overlapped one upon the other.

According to the present invention, there is, further, provided a member to be contacted with the polysilicon arranged at a position where the polysilicon comes in contact therewith, wherein the member to be contacted with the polysilicon comprises a metal substrate and a resin cover provided on the metal substrate, the resin cover comprises two kinds of resin sheets mounted in an overlapped state on the metal substrate, and the surface of the resin sheet positioned on the upper surface comes in contact with the polysilicon.

Preferred examples of the member to be contacted with the polysilicon may include a chute, a hopper and a crushing bed arranged in a course of up to introducing the polysilicon right after produced into the step of producing single crystals of silicon.

Effects of the Invention

According to the present invention, the resin cover is provided on the surface of the metal substrate in the form of two kinds of resin sheets overlapped one upon the other. Therefore, even if the resin sheet (upper resin sheet) arranged on the upper side coming in contact with the polysilicon is worn out permitting the surface under the upper resin sheet to be exposed, the exposed surface is the surface of the resin sheet (lower resin sheet) arranged on the lower side. Therefore, the polysilicon is prevented from coming in contact with the metal substrate and is reliably prevented from being contaminated with the metal. Further, in case the upper resin sheet is worn out, the upper resin sheet only may be replaced requiring a decreased cost for replacing the resin sheet.

According to the invention, further, it is desired that the resin cover is attached to the surface of the metal substrate, i.e., the two kinds of resin substrates are detachably attached to the surface of the metal substrate by using resin bolts. This facilitates the work for attaching and replacing the resin substrates yet avoiding the contamination of the polysilicon with metal caused by the contact with the bolts.

Besides, when the resin covers are provided by using the bolts as described above, the attaching work and the detaching work are facilitated. Therefore, the lower resin sheet which needs to be very rarely replaced due to the wear may be formed to possess a large area, and the upper resin sheet which needs to be highly frequently replaced due to the wear may be formed to possess a small area. Namely, a many number of the upper resin sheets are placed to cover the lower resin sheet without forming gaps, and only those upper resin sheets that are worn out are renewed to lower the cost.

According to the invention, further, the resin cover is provided by overlapping two kinds of resin sheets one upon the other. Therefore, various advantages can be obtained by using the upper resin sheet and the lower resin sheet having different properties.

As the two kinds of the resin sheets, for example, there can be used those having different flexibilities, the resin sheet having higher flexibility being arranged on the lower side. According to this embodiment, the lower resin sheet highly closely adheres to the surface of the underlying metal substrate. Besides, in case stress generates in the direction of the plane due to the contact between the upper resin sheet and the polysilicon, the surface of the lower resin sheet easily undergoes displacement following the upper resin sheet, effectively decreasing the wear due to abrasion between the upper resin sheet and the lower resin sheet. Besides, the upper resin sheet having an increased hardness is little worn out by the contact with the polysilicon and features an increased life.

Further, upon using the two kinds of resin sheets having different color tones, it is made possible to easily and quickly discover the wear in the upper resin sheet. Namely, because of different color tones, in case the upper resin sheet is worn out permitting the surface of the lower resin sheet to be exposed, the color tone of the lower resin sheet can be easily recognized with the eye. Therefore, this embodiment makes it possible not only to greatly decrease the burden on the work of quality control but also to quickly discover the wear in the upper resin sheet and, therefore, to reliably prevent the surface of the metal substrate from being exposed by the wear of the lower resin sheet and to more reliably prevent the polysilicon from being contaminated with metals.

Further, when the upper resin sheet and the lower resin sheet have different color tones as described above, it is desired to use a translucent resin sheet as the upper resin sheet of a color tone different from that of the lower resin sheet. In this case, the color tone of the lower resin sheet gradually appears to be observed from the outer side as the upper resin sheet is worn out. Therefore, the upper resin sheet can be renewed before the surface of the lower resin sheet is completely exposed; i.e., the upper resin sheet can be suitably renewed depending on the degree of wear of the upper resin sheet.

MODE FOR CARRYING OUT THE INVENTION

The method of preventing the polysilicon from being contaminated with metals of the invention can be applied to various metal members arranged at the portions where they come in contact with the polysilicon, and is, particularly, applied to large metal members which require strength and durability but which cannot be replaced by resin members. For example, the member to which the metal contamination prevention method is applied and which is to be contacted with the polysilicon, can be used as the wall of a chute or a hopper at portions where the polysilicon is conveyed, fed or discharged in the course of up to introducing the polysilicon just after produced into the step of producing single crystals of silicon, or can be used as a crusher bed for holding the polysilicon at the time of crushing the polysilicon. The member to be contacted with the polysilicon can be, further, used as an etching vessel for etching the polysilicon or as a member for holding the polysilicon at the time of washing the polysilicon with water or drying the polysilicon.

Figure 1:
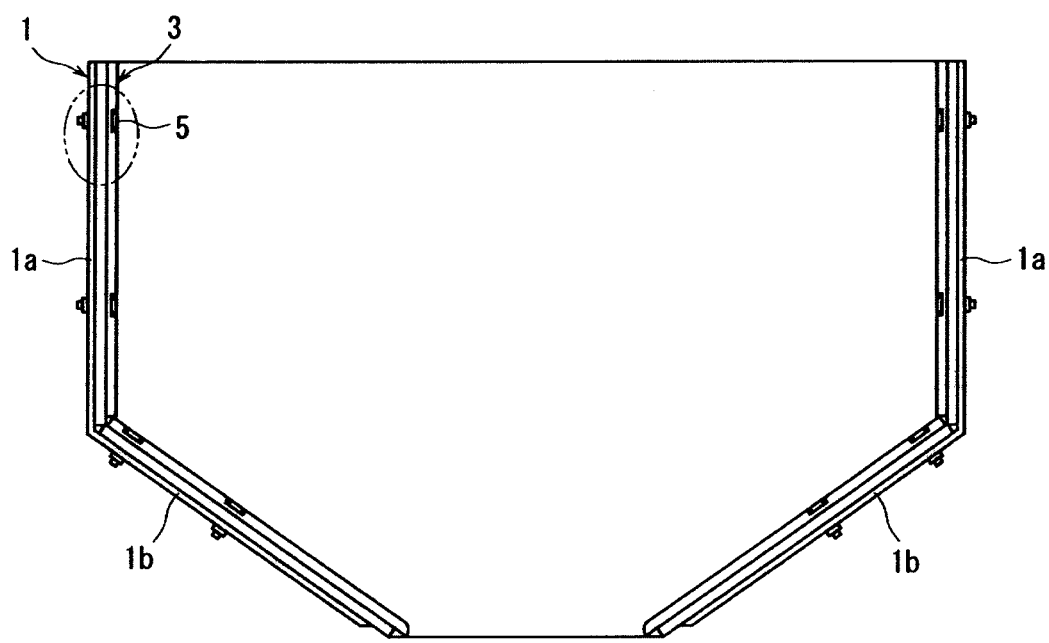
FIG. 1 is a sectional view showing the structure of a hopper to which the method of the invention is applied.
Figure 2:
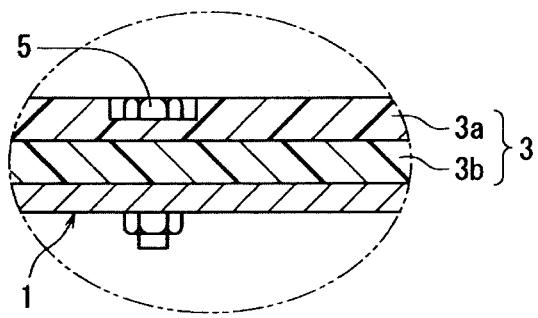
FIG. 2 is a sectional view showing, on an enlarged scale, a portion of the wall surface structure of the hopper of FIG. 1.

FIG. 1 shows a hopper which is a metal substrate to which the method of the invention is applied, and FIG. 2 is a sectional view showing, on an enlarged scale, a portion of the wall surface thereof.

Referring to FIGS. 1 and 2, the metal hopper is formed by using the metal substrate 1 which includes a straight body portion 1a and a tapered portion 1b. The polysilicon is thrown in a massive form or a in a granular from through an upper opening in the straight body portion 1a, is discharged downward through an opening formed in the lower end of the tapered portion 1b, and is fed into a predetermined resin container.

A resin cover 3 covers the whole inner surface of the metal substrate 1 (surface on the side in which will come in contact the polysilicon that is thrown into the hopper) according to the invention. The resin cover 3 works to prevent the polysilicon from coming in contact with the metal substrate 1 to thereby prevent the polysilicon from being contaminated with metals. The resin cover 3 is fixed to the metal substrate 1 by using, for example, resin bolts 5 made from polyamides such as nylon or the like. Since the bolts 5, too, are made from a resin, the polysilicon is reliably prevented from being contaminated with metals.

From the standpoint of durability and the like, the metal substrate 1 is, usually, made of a stainless steel. The metal members, other than the hopper, too, are, usually, made of the stainless steel. Depending upon the use of the metal substrates, there may be used various surface-treated steel sheets or light metal sheets such as aluminum to meet the required properties, as a matter of course.

In the invention, the resin cover 3 is formed in a manner that an upper resin sheet 3a and a lower resin sheet 3b are overlapped one upon the other on the metal substrate 1 and can be separately removed. Namely, the resin sheets 3a and 3b have holes perforated therein for passing the resin bolts 5 through. The upper resin sheet 3a and the lower resin sheet 3b in a manner of being overlapped one upon the other are fixed to the inner surface of the metal substrate 1 by using the resin bolts 5. Namely, the polysilicon comes in contact with the upper resin sheet 3a which, therefore, is gradually worn out. When the surface of the lower resin sheet 3b is exposed due to the wear in the upper resin sheet 3a, the bolts 5 are removed to renew the upper resin sheet 3a only. From the standpoint of easily carrying out the work of replacement, therefore, the bolts 5 are desirably inserted from the side of the upper resin sheet 3a and are fixed. In this case, head portions of the bolts 5 are located on the side of the upper resin sheet 3a. Here, in order for the head portions not to be protruded, the upper surface of the upper resin sheet 3a is suitably dented at portions where the bolts 5 are tightened (i.e., at portions where the holes are formed to pass the bolts 5 through).

There is no special limitation on the thicknesses of the upper resin sheet 3a and the lower resin sheet 3b, and the thicknesses may be suitably selected depending on the degree of wear by the polysilicon. Usually, however, the upper resin sheet 3a that is subject to be greatly worn out by abrasion should have a large thickness while the lower resin sheet 3b may not have such a large thickness which, however, should be so set that the surface of the metal substrate 1 is suppressed from being exposed for a certain period of time even in case the surface of the lower resin sheet 3b is exposed due to the wear of the upper resin sheet 3a.

The upper resin sheet 3a and the lower resin sheet 3b may have any sizes so far as they can cover the whole inner surface of the metal substrate 1 in a state of being overlapped one upon the other. For instance, a plurality of numbers of the lower resin sheets 3b having large areas may be laid to cover the whole inner surface of the metal substrate 1 while the upper resin sheets 3a having small areas may be laid in a plurality of numbers to cover each of the lower resin sheets 3b. The portions that are subject to be easily worn out may be covered with the upper resin sheets 3a of a number larger than the number on other portions. For instance, the upper resin sheets 3a arranged on the tapered portion 1b of FIG. 1 are more worn out by abrasion than those arranged on the straight body portion 1a and must be replaced more frequently. Therefore, an increased number of pieces of the upper resin sheets 3a are arranged on the tapered portion 1b so that only the abraded portions may be replaced offering advantage such as decreasing the cost and facilitating the work of replacement.

According to the method of the present invention as described above, the lower resin sheet 3b is present on the surface of the metal substrate 1 even if the upper resin sheet 3a is worn out due to the contact with the polysilicon. By replacing the upper resin sheet 3a only, therefore, the surface of the metal substrate 1 is prevented at all times from coming in contact with the polysilicon; i.e., the polysilicon is reliably prevented from being contaminated with metals.

In the present invention, there is no special limitation on the resins forming the upper resin sheet 3a and the lower resin sheet 3b so far as they are formed in the shape of sheets. For example, the sheets can be formed by using any one of thermoplastic resin, thermosetting resin or thermoplastic elastomer. Usually, however, it is better to avoid resins containing metal elements, such as ionomers, from the standpoint of preventing the polysilicon from being contaminated with metals. Further, the upper resin sheet 3a and the lower resin sheet 3b may be formed by using the same resin so as to possess the same properties but may be formed by using different resins or may be formed to possess different properties even by using the same resin in order to impart properties depending upon the positions of the upper resin sheet 3a and the lower resin sheet 3b.

For example, the resins having different flexibilities can be used as the upper resin sheet 3a and the lower resin sheet 3b. Concretely, it is desired to use a resin having a high flexibility [e.g., a rubber hardness (JIS K6253 Shore A) of less than A90] as the lower resin sheet 3b and a resin having a rubber hardness of not less than A90 as the upper resin sheet 3a that requires abrasion resistance. In this case, a highly close adhesion is maintained between the lower resin sheet 3b and the surface of the metal substrate 1 not only contributing to enhancing the protective effect for the metal substrate 1 but also permitting the surface of the lower resin sheet 3b to displace following the upper resin sheet 3a in case stress has generated in the direction of plane due to the polysilicon that has come in contact with the upper resin sheet 3a, effectively lowering the wear caused by rubbing between the upper resin sheet 3a and the lower resin sheet 3b. Further, the upper resin sheet 3a having a high hardness features improved durability, and the frequency of replacement can be lowered.

Further, with the color tone being different between the upper resin sheet 3a and the lower resin sheet 3b, the upper resin sheet 3a that is worn out can be discovered easily and quickly contributing to reducing the burden on the work of quality control. Namely, since the color tone is different, in case the upper resin sheet 3a is worn out permitting the surface of the lower resin sheet 3b to be exposed, the color tone of the lower resin sheet 3b can be easily recognized with the eye greatly reducing the burden on the work of quality control. Further, the wear in the upper resin sheet 3a can be quickly discovered, the timing for replacement can be reliably judged, the surface of the metal material 1 is reliably prevented from being exposed that is caused by the wear in the lower resin sheet 3b, and the polysilicon can be more reliably prevented from being contaminated with metals.

When the upper resin sheet 3a and the lower resin sheet 3b are formed in different color tones, it is most desired that the lower resin sheet 3b is colored specifically in black, red, blue or green so that the surface thereof can be recognized at a glance in case it is exposed and, at the same time, that the upper resin sheet 3a remains translucent, specifically, achromatic such as in white color. According to this embodiment, the color tone of the lower resin sheet 3b gradually appears to be observed from the outer side as the upper resin sheet 3a is worn out and its thickness gradually decreases making it possible to grasp the degree of wear in the upper resin sheet 3a.

In adjusting the color tone, it is desired to use an organic pigment, dye or carbon black instead of using an inorganic pigment from the standpoint of preventing the polysilicon from being contaminated with metals. Specifically, the upper resin sheet 3a comes in contact with the polysilicon at all times and it is desired that its color tone is the one developed in a state without containing any pigment.

The degree of translucency of the upper resin sheet 3a is, usually, such that the cloudiness (haze) thereof is in a range of about 20 to 90 from the standpoint of clearly recognizing the wear in the upper resin sheet 3a depending on the transmission of color tone of the lower resin sheet 3b and of easily recognizing the timing for replacement. That is, if the upper resin sheet 3a has such a high transparency that the color tone of the lower resin sheet 3b can be recognized from the first time, then the degree of progress of wear cannot be recognized. If the degree of opaqueness is too high, on the other hand, the timing for replacing the upper resin sheet 3a cannot be recognized until the surface of the lower resin sheet 3b is exposed after the upper resin sheet 3a is worn out.

In the example shown in FIG. 1 above, the hopper is made from the member to be contacted with the polysilicon to which is applied the method of preventing the polysilicon from being contaminated with metals of the present invention. The member to be contacted with the polysilicon, however, is not limited to the hopper only but can also be used as a member for use in various places where the polysilicon will come in contact therewith, such as chute or crusher bed, as well as etching vessel, water-washing vessel, drier and the like. Depending upon the mode of use, further, the kinds of the resin materials of the resin sheets 3a and 3b may be suitably changed.

For example, when the present invention is applied to a metal substrate which requires a hardness, such as a crusher bed, it is desired that the upper resin sheet 3a has a particularly high hardness. In this case, further, it is particularly desired that the resin sheets 3a and 3b and, specifically, the upper resin sheet 3a are formed by using a polyamide such as nylon or by using a polyolefin such as polyethylene or polypropylene. This is because the abraded powder of resin mixed into the polysilicon can be removed in the step of etching or in the step of washing with water carried out after the crushing. That is, the polyamide dissolves in a chemical solution used at the time of etching. Therefore, the abraded powder thereof can be removed from the polysilicon in the step of etching. The polyolefin, on the other hand, floats on water and, therefore, the abraded powder can be removed from the polysilicon in the step of washing with water. Of them, the polypropylene is hard, features excellent abrasion resistance, and is best suited as a resin material for forming the upper resin sheet 3a.

Further, when the lower resin sheet 3b is formed by using a fluorine-contained resin such as polytetrafluoroethylene containing a trace amount of comonomer, wear of the resin sheets 3a and 3b can be effectively suppressed owing to its high resistance against chemicals and flexibility and, besides, the metal substrate 1 can be protected from chemical solutions.

According to the present invention as described above, two kinds of resin sheets 3a and 3b are provided being overlapped one upon the other on the surface of the metal substrate that constitutes a hopper as well as any other metal substrates to thereby reliably prevent the polysilicon from being contaminated with metals while vary simplifying the work of quality control.

DESCRIPTION OF REFERENCE NUMERALS

1: metal substrate
3: resin cover
3a: upper resin sheet
3b: lower resin sheet
5: resin bolts

The invention claimed is:
1. A member to be contacted with polysilicon arranged at a position where the polysilicon comes into contact therewith, wherein:
   said member to be contacted with the polysilicon is a chute, a hopper, or a crusher bed arranged in a course of up to introducing the polysilicon right after it is produced into a step of producing single crystals of silicon,
   wherein said member to be contacted with the polysilicon comprises a metal substrate and a resin cover provided on said metal substrate,
   said resin cover comprises two kinds of resin sheets in a state of being overlapped one upon the other on said metal substrate,
   a surface of a resin sheet positioned on an upper surface comes into contact with the polysilicon,
   the two kinds of resin sheets are detachably attached to the metal substrate by resin bolts;
   the two kinds of resin sheets have flexibilities different from each other, wherein a resin sheet having a higher flexibility is arranged on a lower side, and a sheet having a lower flexibility is arranged on an upper side where the polysilicon comes into contact therewith,
   the two kinds of resin sheets have color tones different from each other; and the resin sheet having the higher flexibility, and which is arranged on the lower side, is closely attached to an entire surface of the metal substrate.

* * * * *